(12) United States Patent
Crowley et al.

(10) Patent No.: US 6,200,488 B1
(45) Date of Patent: Mar. 13, 2001

(54) WATER BOTTLE CAP

(75) Inventors: Dennis E. Crowley, Adams; Jason Ritton, Schenevus, both of NY (US)

(73) Assignee: Oxygen8, Inc., Jamaica, NY (US)

( * ) Notice: Subject to any disclaimer, the term of this patent is extended or adjusted under 35 U.S.C. 154(b) by 0 days.

(21) Appl. No.: 09/181,415

(22) Filed: Oct. 28, 1998

(51) Int. Cl.[7] .................................................. C02F 1/72
(52) U.S. Cl. ............................ 210/758; 210/232; 426/67
(58) Field of Search ................................... 210/758, 232; 426/67

(56) References Cited

U.S. PATENT DOCUMENTS

| | | |
|---|---|---|
| 1,142,210 | 6/1915 | Wagner . |
| 3,061,130 | 10/1962 | Husum . |
| 3,938,686 | 2/1976 | Milligan et al. . |
| 4,294,368 * | 10/1981 | Bodenbender et al. ............. 215/256 |
| 4,991,635 | 2/1991 | Ulm . |
| 5,006,352 * | 4/1991 | Zelenak Nee Zoltai et al. ..... 426/67 |
| 5,121,778 | 6/1992 | Baker et al. . |
| 5,370,270 | 12/1994 | Adams et al. . |
| 5,542,555 | 8/1996 | Hidding et al. . |
| 5,687,865 | 11/1997 | Adams et al. . |
| 5,853,096 * | 12/1998 | Bartur et al. ......................... 215/261 |
| 5,885,467 * | 3/1999 | Zelenak et al. ...................... 210/758 |

* cited by examiner

Primary Examiner—David A. Simmons
Assistant Examiner—Betsey Morrison Hoey
(74) Attorney, Agent, or Firm—Schmeiser, Olsen & Watts

(57) ABSTRACT

A water bottle cap for sealing a water bottle containing water supersaturated with oxygen The water bottle cap of the present invention is designed to help maintain the supersaturated oxygen level of the oxygenated water in the water bottle from the time of bottling throughout the usage cycle of the water bottle.

16 Claims, 3 Drawing Sheets

WATER BOTTLE CAP

The present patent application is related to U.S. patent application Ser. No. 08/878,609, filed Jun. 19, 1997, now U.S. Pat. No. 5,868,944, issued Feb. 9, 2000, and entitled "Oxygenated Water Cooler," and U.S. patent application Ser. No. 09/124,490, filed concurrently herewith, now U.S. Pat. No. 6,017,447, issued Jan. 25, 2000, and entitled "Oxygenated Water Cooler."

FIELD OF THE INVENTION

The present invention relates generally to a water bottle cap and, more particularly, a water bottle cap for sealing a water bottle containing water supersaturated with oxygen. The water bottle cap of the present invention is designed to help maintain the supersaturated oxygen level of the oxygenated water in the water bottle from the time of bottling throughout the usage cycle of the water bottle.

BACKGROUND OF THE INVENTION

Bottles containing water are normally transported to a location having a water cooler, and are stored until needed. When replacement is necessary, a seal on the bottle cap of the water bottle is removed and the water bottle is inverted and placed on the top section of the water cooler. Typically, water flows from the water bottle to a tank in the water cooler where the water is cooled. The water is dispensed from the tank through a spigot or similar device.

A water bottle cap is generally designed to prevent leakage of water from the water bottle during transportation, storage, and dispensing. Some bottle caps are even designed to prevent water from spilling onto the floor or other surface when an inverted, partially empty water bottle is removed from a water cooler. Unfortunately, currently available bottle caps are not suitable for use with water bottles containing water that is supersaturated with oxygen or other gases, or bottles containing fluids under pressure. Specifically, such bottle caps are not configured to help maintain the oxygen content of oxygenated water within a water bottle during the transportation and storage of the water bottle, and during the dispensing of the oxygenated water from the water bottle when mounted on a water cooler. The bottle caps are not capable of preventing leakage of oxygen from the water bottle, and cannot contain pressure above ambient levels within the water bottle.

It would, therefore, be highly desirable to provide a new and improved bottle cap for a water bottle containing oxygenated water, wherein the bottle cap is capable of preventing leakage of oxygen and pressure from the water bottle during transportation and storage of the water bottle, and wherein the bottle cap helps to maintain the oxygen level of the oxygenated water within the water bottle throughout the entire usage cycle of the water bottle.

The present invention also relates to a new and improved water cooler for dispensing oxygen enriched water. Oxygen enriched drinking water has an enhanced taste appeal and offers the health and fitness conscious consumer an alternative and supplemental source of oxygen that is absorbed through the stomach. The term drinking water is intended to include, without limitation, spring water, filtered water, or water treated by the reverse osmosis process.

The dissolved oxygen content of natural pure spring water ranges from between about 5 mg/liter to 9 mg/liter depending on the source of the water, purification and processing techniques applied prior to bottling, and other factors. The water can be supersaturated with oxygen by injecting molecular oxygen into a water pipeline controlled at a pressure of 40–90 PSIG (pounds per square inch gage), or using other known methods. Using this technique, the dissolved oxygen level of the water can be increased to about 25–125 mg/liter. If bottled immediately and hermetically sealed, using the bottle cap of the present invention, in bulk glass bottles or other suitable containers, the oxygenated water will maintain the elevated dissolved oxygen level indefinitely.

Bulk water bottles typically are in the 3–5 gallon range. Upon opening a bulk water bottle containing water that is supersaturated with oxygen, and which includes a conventional bottle cap, and installing the water bottle on a standard water cooler, the dissolved oxygen in the water decreases to near the baseline level of about 5–9 mg/liter within about 3–5 days. Since the average time required to consume a 3–5 gallon bulk water bottle typically is in the 10–14 day range, the rapid decrease in dissolved oxygen prevents the commercial marketing of oxygen enriched drinking water in 3–5 gallon bulk bottles for use on standard water coolers.

It would, therefore, also be highly desirable to provide a new and improved water cooler for dispensing oxygen enriched water wherein the dissolved oxygen content of water in the water bottle installed on the water cooler is maintained at or about the original supersaturated level during the entire time oxygenated water is dispensed from the bottle by the water cooler, i.e., during the entire usage cycle of the water bottle.

SUMMARY OF THE INVENTION

The present invention provides a new and improved water bottle cap for a bulk water bottle containing oxygenated water under pressure. The bottle cap of the present invention prevents leakage of oxygen and pressure from the water bottle during transportation and storage of the water bottle, and helps to maintain the oxygen level of the oxygenated water within the water bottle throughout the usage cycle of the water bottle.

The bottle cap of the present invention is attached to a water bottle immediately after oxygen enriched water is introduced into the water bottle at a bottling plant. The bottle cap is typically placed over the opening formed in the neck of the water bottle. From this point on, throughout the usage cycle of the water bottle, the bottle cap helps to maintain the supersaturated level of oxygen in the oxygenated water contained in the water bottle.

After bottling, the water bottle is typically transported to a location having a water cooler, and is stored until needed. During transportation and storage of the water bottle, the water bottle is often shaken, handled, etc., in a rough manner, and is often transported and stored on its side such that the water therein applies a force against the bottle cap. A conventional bottle cap is generally not capable of handling such stresses, especially when the water in the water bottle is held under pressure, and will often crack, leak, or otherwise malfunction, thereby allowing the oxygen within the oxygenated water stored in the water bottle to escape. The bottle cap of the present invention, however, has been ingeniously reinforced to withstand such rough handling and the increased pressure within the water bottle without failing, thereby ensuring that the oxygen level of the oxygenated water in the water bottle remains at a supersaturated level.

The bottle cap of the present invention includes a reinforced seal to further strengthen the bottle cap and to enhance the pressure sealing performance of the bottle cap.

When replacement is necessary, the reinforced seal on the bottle cap of the water bottle is removed and the water bottle is inverted and placed on the top section of a water cooler. A probe sleeve in the bottle cap seals around the feed probe of the water cooler, preventing the loss of pressurized oxygen or water from the water bottle. In use, when oxygenated water flows from the water bottle into the tank in the water cooler, make-up oxygen is pumped through the feed probe into the water bottle in order to maintain pressurized oxygen (about 2 PSIG) in the water bottle.

Thus, the bottle cap of the present invention prevents the leakage of water, pressure, and oxygen from a water bottle containing oxygenated water under pressure.

In order to provide the requirements mentioned above, the improved water bottle cap of the present invention generally includes a flexible plastic body, two layers of foil heat glued to the outer top surface of the body, a reinforcing element positioned against the inner top surface of the body, a gasket located adjacent the reinforcing element, and a band tightened around an outer peripheral portion of the body.

Although described for use with water bottles containing oxygenated water under pressure, it should be readily apparent that the bottle cap of the present invention may be used on bottles or other bulk containers containing "normal" unoxygenated water or other fluids, containing fluids that have been supersaturated with other types of gases, such as carbon dioxide ($CO_2$) or the like, or containing fluids stored under ambient or elevated pressures.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
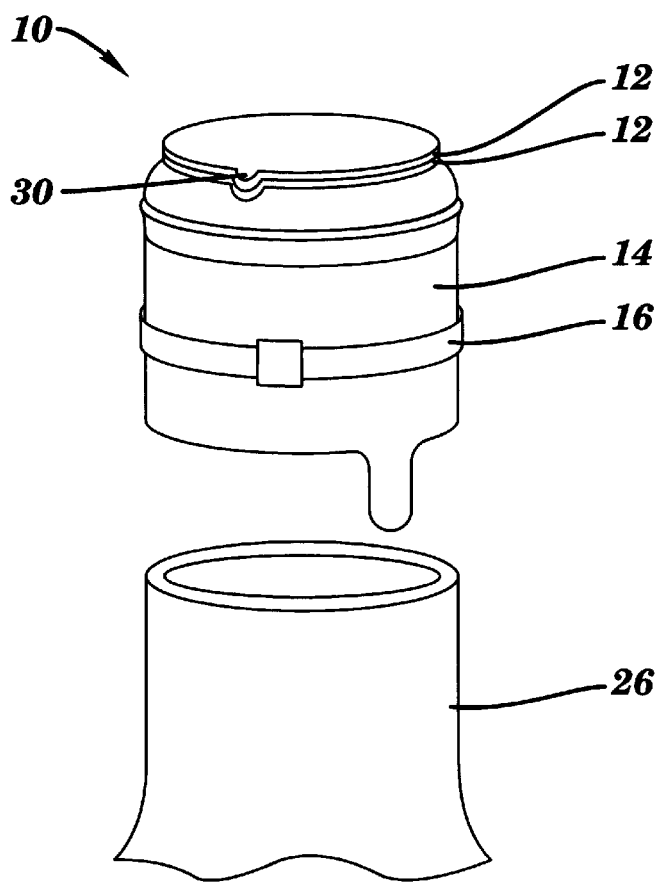
FIG. 1 is a perspective view of a bottle cap in accordance with a preferred embodiment of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings.

Figure 2:
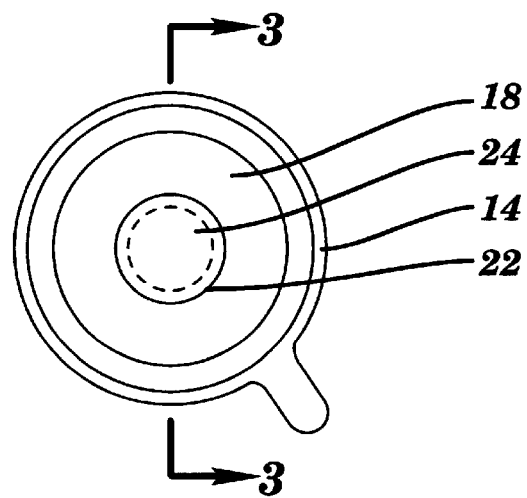
FIG. 2 is a bottom view of the bottle cap of FIG. 1.
Figure 3:
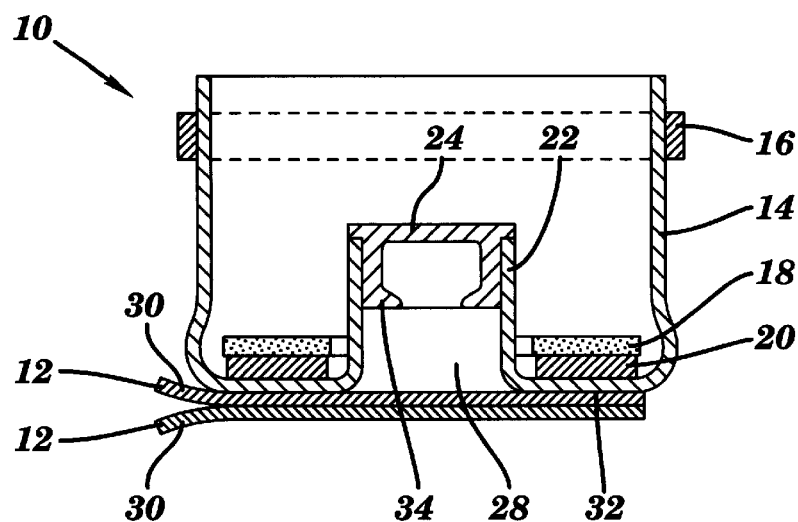
FIG. 3 is a cross-sectional view of the bottle cap taken along the line 3—3 of FIG. 2.

A bottle cap 10 in accordance with a preferred embodiment of the present invention is illustrated in various views in FIGS. 1, 2 and 3. The bottle cap 10 generally includes a plurality of seals 12, a body 14, a band 16, a gasket 18, a reinforcing element 20, a probe sleeve 22, and a plug 24.

As illustrated in FIG. 1, the band 16 extends around the circumference of the body 14, and is tightened after the bottle cap 10 is positioned over the open end of a water bottle 26. Since the oxygen in the bottle 26 is pressurized, the band 16 is provided to secure the bottle cap 10 on the bottle 26, during transportation, storage, and usage. That is, the band 16 is provided to prevent the bottle cap 10 from being inadvertently forced off the water bottle 26 by the pressurized oxygen in the headspace of the water bottle 26. The band can be made of metal or plastic or any other suitable material having sufficient strength. The band 16 can be secured around the neck of the water bottle 26 using known techniques. Other means for clamping the body 14 of the bottle cap 10 around the neck of the water bottle 26 may also be used. Preferably, the bottle cap 10 cannot be removed from the water bottle 26 without first removing the band 16.

A plurality of seals 12 are shown in FIG. 1 and in the cross-sectional view of FIG. 3. The seals 12 prevent contaminants from entering a probe cavity 28 of the bottle cap 26. Additionally, the seals 12 prevent oxygen and pressure from leaking from the water bottle 26 during transportation and storage of the water bottle 26. The seals 12 are preferably formed of a foil material or other material that is impermeable to oxygen. The seals 12 are secured by heat sealing, adhesive, or other suitable means to an outer surface of a top portion 32 of the body 14 of the bottle cap 10, or to an underlying seal 12. For increased strength, a plurality of the seals 12 are sandwiched together as shown. Alternately, a single seal 12, formed of an oxygen impermeable material that is strong enough to withstand the elevated pressure within the water bottle 26, may be used. Each seal 12 includes a tab 30 to facilitate the removal of the seal from the water bottle 26.

Since the water bottle 26 contains pressurized oxygen, a reinforcing element 20 is provided to reinforce and prevent bulging of the top portion 32 of the body 14 of the bottle cap 10. Without the reinforcing element 20, the pressure in the water bottle 26 may cause the top portion 32 of the body 14 of the bottle cap 10 to bulge outward. Such distortion could loosen the seals 12, damage the probe sleeve 22 and plug 24 or other water transfer elements, or otherwise adversely affect the operation of the bottle cap 10, potentially resulting in the leakage of oxygen, pressure and water from the water bottle 26. Preferably, the reinforcing element 20 has an annular shape configured to encircle the probe sleeve 22 and plug 24, and is formed of metal (e.g., stainless steel) or other material having sufficient strength to prevent bulging of the bottle cap 26. Of course the exact shape of the reinforcing element 20 is dependent on the specific configuration of the bottle cap 10.

Figure 4:
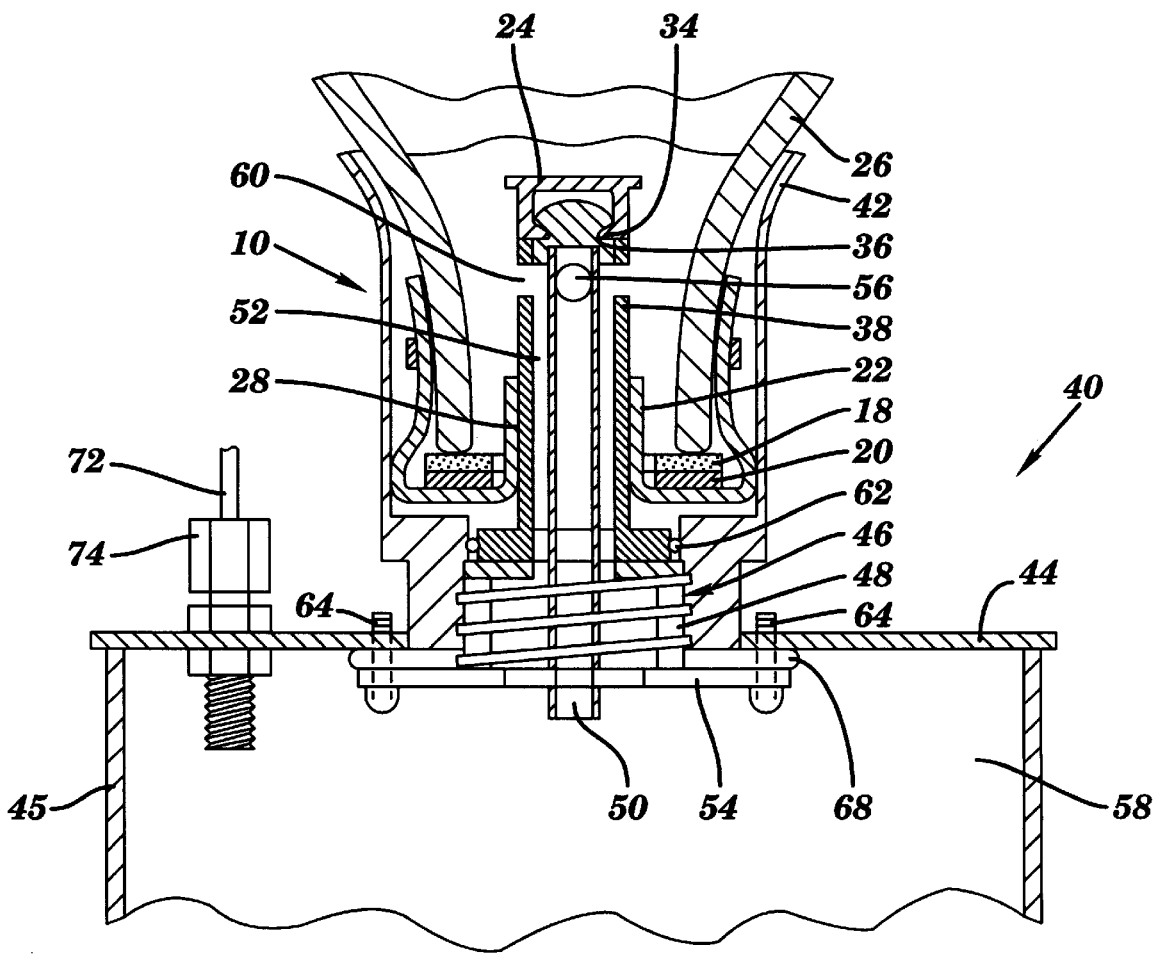
FIG. 4 is a cross-sectional view of a water bottle including a bottle cap in accordance with the present invention, installed on a water cooler.

In order to provide additional leakage prevention, and to provide a layer of cushioning between the reinforcing element 20 and the neck of the water bottle 26, a gasket 18 is located between the reinforcing element 20 and the neck of the water bottle 26 as shown in FIG. 4. The gasket 18 preferably has an annular shape similar to that of the reinforcing element 20, and is formed from foam or other material having suitable resiliency. The gasket 18 may also be formed of a resilient material which is impermeable to water and oxygen.

As shown in FIG. 3, a plug 24 is located in the probe sleeve 22. When the water bottle is inverted, the plug 24 prevents water from spilling from the inverted water bottle 26. In FIG. 3 the plug 24 is shown in the sealing position. The plug 24 additionally includes a gripping rib 34 that is configured to engage a groove 36 formed on a feed probe 38 of a water cooler 40 in the dispensing position (see FIG. 4).

Figure 5:
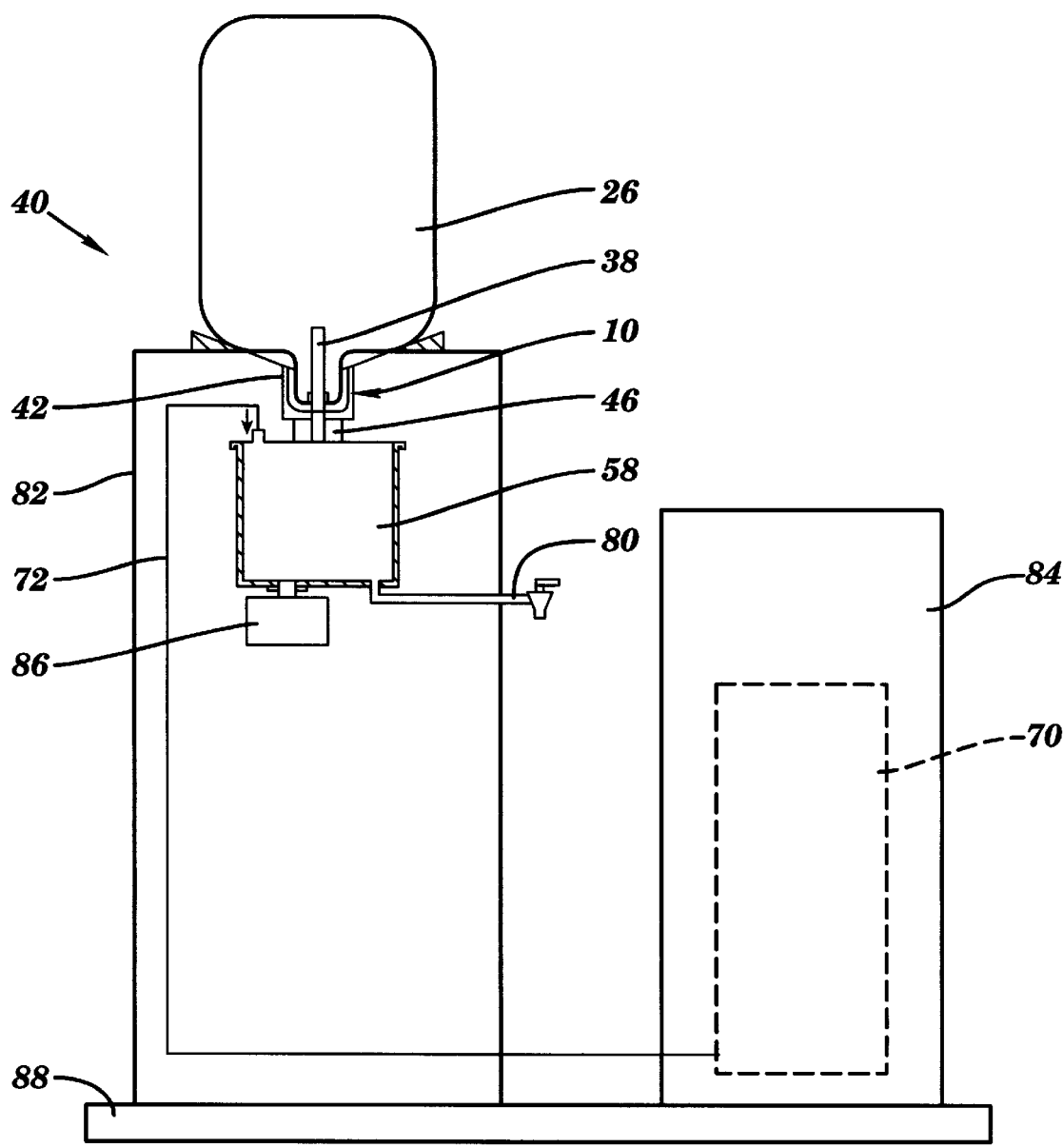
FIG. 5 is a diagrammatic view of a water bottle including a bottle cap in accordance with the present invention, installed on a water cooler.

FIGS. 4 and 5 show the bottle cap 10 of the present invention attached to a water bottle 26 which has been inverted and positioned on a water cooler 40. FIG. 4 illustrates the inverted water bottle 26 supported on a bottle entry portion 42 of the water cooler 40. The bottle entry portion 42 is attached to a lid 44 of a water tank 58 of the water cooler 40 by a mounting adapter assembly 46.

The mounting adapter assembly 46 includes a feed probe 38 having a groove 36, a threaded fastener 48, a liquid conduit 50, an oxygen conduit 52, and a mounting flange 54. The central, upwardly projecting feed probe 38 is configured to enter the probe cavity 28 of the bottle cap 10 when the water bottle 26 is installed on the water cooler 26. Specifically, as the bottle 26 is lowered onto the feed probe 38, the feed probe 38 pushes the plug 24 in an upward direction until the plug 24 is no longer in contact with the probe sleeve 22, thereby allowing oxygenated water to flow out of the water bottle 26 and oxygen to flow into the water bottle 26 via the feed probe 38. At the same time, as further shown in FIG. 4, the gripping rib 34 on the plug 24 engages the groove 36 on the feed probe 38, preventing the plug 24 from escaping into the water bottle 26. When the water bottle 26 is lifted away from the water cooler 40, the plug 24 is lowered by the feed probe 38 until the plug 24 reenters the probe sleeve 22 and seals the probe cavity 28, preventing water (if any) from spilling from the inverted bottle 26.

When the water bottle 26 is installed on the water cooler 40, the plug 24 is no longer in contact with the probe sleeve 22. This allows oxygenated water from the water bottle 26 to enters a liquid conduit 50 through a port 56. The oxygenated water flows through the liquid conduit 50 and passes into the water tank 58 located in the water cooler 40. At the same time, to replace the volume of oxygenated water dispensed from the water tank 58, an equivalent volume of make-up oxygen, present within a headspace of the water tank 58, flows up through an oxygen conduit 52 in the feed probe 38 into the water bottle 26 through an oxygen port 60. The oxygen flows through the remaining oxygenated water in the water bottle 26 to a headspace of the bottle, thereby maintaining the supersaturated oxygen level of the oxygenated water in the water bottle 26.

The mounting adapter assembly 46 is attached to the bottle entry portion 42 by the threaded fastener 48. A flexible circular seal 62 is located between the bottle entry portion 42 and the and the mounting adapter assembly 46. The circular seal 62 prevents oxygen from leaking from the water tank 58 through the threaded fastener 48 into the bottle entry portion 42 of the water cooler 40. The mounting adapter assembly 46 includes a flange 54 that is attached by threaded fasteners 64 or other suitable hardware to the water tank lid 44. In order to provide a strong rigid support for the weight of the water bottle 26, both the water tank lid 44 and the flange 54 are preferably formed of a strong, rustproof material such as stainless steel. A suitable flexible sealing material 68, such as such as silicone rubber or the like, is applied to the surface between the flange 54 and the water tank lid 44. The flexible sealing material 68 is provided to prevent oxygen or water from escaping from the water tank 58.

As shown by the combination of FIGS. 4 and 5, oxygen flows from an oxygen source 70 through a conduit 72 into the water tank 58. The conduit 72 is attached to the water tank lid 44 by a tubing connection 74. The water tank 58 is sealed to contain not only the oxygenated water, but also a supply of pressurized oxygen generated by the oxygen source 70. As described above, the oxygen in the water tank 58 flows into the water bottle 26 as oxygenated water is dispensed from the water cooler 40 to maintain the supersaturated oxygen level of the oxygenated water in the water bottle 26.

The general structure of the water cooler 40 is illustrated in FIG. 5. The water cooler 40 includes the water bottle 26, bottle cap 10, bottle entry portion 42, mounting adapter assembly 46 including the feed probe 38, and the water tank 58. The water cooler 40 additionally includes a spigot assembly 80 for dispensing oxygenated from the water tank 58, a refrigeration source 86 for cooling the oxygenated water within the tank 58, a base 88, and a housing 82. The preferred form of the oxygen source 70 is an oxygen generator in the form of a pressure swing adsorption apparatus, however other sources such as bottled oxygen may also be used. Oxygen flows from the oxygen source 70 to the water tank 58 through the conduit 72. The oxygen source 70 may be located in the same housing 82 as the water cooler 40, or may alternately be enclosed within a housing 84 formed separately from the housing 82 as shown in FIG. 5.

In operation, oxygenated water flows from the water bottle 26, through the feed probe 38 which extends into the water bottle 26 through the bottle cap 10, into the pressurized water tank 58. In the water tank 58 the oxygenated water is cooled by the refrigeration source 86. The oxygenated water is dispensed from the water tank 58 through the spigot assembly 80 for drinking or other uses.

As the oxygenated water is drawn from the water bottle 26, a like amount of make-up oxygen flows from the water tank 58 up through the feed probe 38 into the water bottle 26, thereby maintaining a positive pressure within the water bottle 26. The oxygen in the water tank 58 is replaced by oxygen flowing from the oxygen source 70 through the conduit 72 into the water tank 58.

What is claimed is:

1. A method maintaining a dissolved oxygen content of oxygenated water in a water bottle at a supersaturated level prior to dispensing, comprising the steps of:

filling a headspace of the water bottle above the oxygenated water with pressurized oxygen;

sealing an opening in the water bottle with a cap; and providing the cap with an element to prevent deformation of the cap by the pressurized oxygen in the headspace of the water bottle.

2. The method according to claim 1, wherein the element is a reinforcing element.

3. The method according to claim 1, further including the step of:

fixedly securing the cap to the water bottle to prevent the cap from being forced off the water bottle by the pressurized oxygen in the headspace of the water bottle.

4. The method according to claim 3, wherein the step of securing the cap further includes the step of:

securing a band around a body of the bottle cap.

5. The method of claim 4, wherein the band is metal or plastic.

6. The method according to claim 1, wherein the step of sealing an opening in the water bottle further includes the step of:

sandwiching a plurality of seal elements together over a water dispensing opening in the cap.

7. The method of claim 1, wherein the step of sealing an opening in the water bottle further includes the step of:

attaching a seal element over a water dispensing opening in the cap.

8. The method of claim 1, wherein the oxygen level in the water bottle is maintained at a level of above at least about 36 mg/liter.

9. A method for maintaining a dissolved oxygen content of oxygenated water in a water bottle at a supersaturated level prior to dispensing, comprising:

filling a headspace of the water bottle above the oxygenated water with pressurized oxygen;

providing a cap with a reinforcing element to prevent deformation of the cap by pressurized oxygen in the headspace of the water bottle;

providing a gasket located adjacent the reinforcing element for preventing leakage from the water bottle, and for providing a cushioning layer between the reinforcing element and the water bottle; and sealing an opening in the water bottle with the cap.

10. A method maintaining a dissolved oxygen content of oxygenated water in a water bottle at a supersaturated level prior to dispensing, comprising:

filling a headspace of the water bottle above the oxygenated water with pressurized oxygen;

sealing an opening in the water bottle with a cap; and sandwiching a plurality of seal elements together over a water dispensing opening in the cap, wherein the plurality of seal elements are impermeable to water and oxygen.

11. The method of claim 10, wherein the seal elements are foil.

12. The method of claim 10, further including hot sealing the seal elements to the cap.

13. A method for maintaining a dissolved oxygen content of oxygenated water in a water bottle at a supersaturated level prior to dispensing, comprising:

filling a headspace of the water bottle above the oxygenated water with pressurized oxygen;

sealing an opening in the water bottle with a cap;

sandwiching a plurality of seal elements together over a water dispensing opening in the cap; and providing a reinforcing element encircling the opening in the cap for preventing deformation of the cap.

14. The method of claim 13, wherein the reinforcing element is stainless steel.

15. The method of claim 13, further including providing a gasket located adjacent the reinforcing element for preventing leakage from the water bottle, and for providing a cushioning layer between the reinforcing element and the water bottle.

16. A method for maintaining a dissolved oxygen content of oxygenated water in a water bottle at a supersaturated level prior to dispensing, comprising:

filling a headspace of the water bottle above the oxygenated water with pressurized oxygen;

sealing an opening in the water bottle with a cap; and providing a probe sleeve attached to a periphery of the opening in the cap, and a removable plug inserted in the probe sleeve, wherein the probe sleeve and removable plug removingly engages with a probe of a water cooler.

* * * * *